(12) United States Patent
Antonopoulos et al.

(10) Patent No.: US 9,164,793 B2
(45) Date of Patent: Oct. 20, 2015

(54) PRIORITIZED LOCK REQUESTS TO REDUCE BLOCKING

(71) Applicant: Microsoft Corporation, Redmond, WA (US)

(72) Inventors: Panagiotis Antonopoulos, Redmond, WA (US); Hanumantha Rao Kodavalla, Sammamish, WA (US); Naveen Prakash, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 396 days.

(21) Appl. No.: 13/723,854

(22) Filed: Dec. 21, 2012

(65) Prior Publication Data

US 2014/0181342 A1    Jun. 26, 2014

(51) Int. Cl.
 G06F 12/00    (2006.01)
 G06F 9/46    (2006.01)
 G06F 9/52    (2006.01)

(52) U.S. Cl.
 CPC ............... G06F 9/466 (2013.01); G06F 9/526 (2013.01); G06F 2209/522 (2013.01); G06F 2209/523 (2013.01)

(58) Field of Classification Search
 USPC ......................................................... 710/200
 See application file for complete search history.

(56) References Cited

U.S. PATENT DOCUMENTS

| | | | |
|---|---|---|---|
| 5,283,903 A * | 2/1994 | Uehara | 710/200 |
| 5,440,752 A * | 8/1995 | Lentz et al. | 710/123 |
| 5,625,815 A | 4/1997 | Maier et al. | |
| 5,857,110 A * | 1/1999 | Sakakibara et al. | 712/2 |
| 5,862,355 A * | 1/1999 | Logsdon | 710/116 |
| 5,872,909 A * | 2/1999 | Wilner et al. | 714/38.12 |
| 5,872,981 A * | 2/1999 | Waddington et al. | 710/200 |
| 6,081,665 A * | 6/2000 | Nilsen et al. | 717/116 |
| 6,122,640 A | 9/2000 | Pereira | |
| 6,253,225 B1 * | 6/2001 | Nakahara et al. | 718/100 |
| 6,480,918 B1 * | 11/2002 | McKenney et al. | 710/200 |
| 6,678,065 B1 * | 1/2004 | Hikawa | 358/1.13 |
| 6,723,190 B1 * | 4/2004 | Gill et al. | 149/19.3 |

(Continued)

OTHER PUBLICATIONS

Stanek, William R., "SQL Server 2008 R2: Unlock the Locks", Published on: Jan. 5, 2011, Available at: http://redmondmag.com/Articles/2011/01/01/SQL-Server-2008-R2-Unlock-the-Locks.aspx.

(Continued)

*Primary Examiner* — Paul R Myers
(74) *Attorney, Agent, or Firm* — Henry Gabryjelski; Doug Barker; Micky Minhas (57) ABSTRACT

A method includes requesting a lock on a resource. The request for the lock on the resource is specified as a low priority non-blocking request that does not block one or more other requests such that one or more other requests can request a lock on the resource and obtain the lock on the resource in priority to the low priority non-blocking request. Based on the low priority request, the method includes maintaining the low priority request in a non-blocking fashion until a predetermined condition occurs. As a result of the predetermined condition occurring, the method includes handling the low priority request such that it is no longer treated as a low priority non-blocking request. Embodiments may further include a kill request which kills any operations on the resource, aborts any transactions having a lock on the resource, and locks the resource.

20 Claims, 3 Drawing Sheets

(56) References Cited

U.S. PATENT DOCUMENTS

| | | | |
|---|---|---|---|
| 6,910,212 B2* | 6/2005 | Brenner et al. | 718/104 |
| 6,920,632 B2* | 7/2005 | Donovan et al. | 718/103 |
| 6,965,961 B1* | 11/2005 | Scott | 710/310 |
| 6,973,521 B1* | 12/2005 | Indiresan et al. | 710/200 |
| 7,392,299 B2* | 6/2008 | Maekawa | 709/220 |
| 7,647,443 B1* | 1/2010 | Chatterjee et al. | 710/200 |
| 7,844,973 B1* | 11/2010 | Dice | 718/108 |
| 7,886,300 B1* | 2/2011 | Long et al. | 718/104 |
| 8,261,279 B2* | 9/2012 | Accapadi et al. | 718/104 |
| 2004/0024987 A1* | 2/2004 | Lentz et al. | 712/29 |
| 2004/0034642 A1* | 2/2004 | Szilagyi et al. | 707/100 |
| 2004/0039884 A1* | 2/2004 | Li | 711/156 |
| 2004/0117791 A1* | 6/2004 | Prasad et al. | 718/100 |
| 2005/0022186 A1* | 1/2005 | Accapadi et al. | 718/100 |
| 2005/0275875 A1* | 12/2005 | Jennings, Jr. | 358/1.15 |
| 2008/0005740 A1* | 1/2008 | Terrell | 718/102 |
| 2009/0006403 A1* | 1/2009 | McKenney | 707/8 |
| 2009/0150396 A1 | 6/2009 | Elisha et al. | |
| 2010/0114967 A1 | 5/2010 | Yaniv et al. | |
| 2010/0250508 A1* | 9/2010 | Erofeev | 707/704 |
| 2011/0246694 A1* | 10/2011 | Ichinose | 710/200 |
| 2013/0132627 A1* | 5/2013 | Dong et al. | 710/200 |

OTHER PUBLICATIONS

Henderson, Ken, "SQL Server 2005 Waiting and Blocking Issues", Published on: Apr. 20, 2007, Available at: http://www.informit.com/articles/article.aspx?p=686168&seqNum=5.

Randal, Paul S., "In Recovery", Published on: Apr. 26, 2011, Available at: http://www.sqlskills.com/blogs/paul/category/Locking.aspx.

Fridley, Barry, "Avoid Locking Conflicts", Retrieved on: Nov. 27, 2012, Available at: http://msdn.microsoft.com/en-us/library/aa260979%28v=VS.60%29.aspx.

* cited by examiner

PRIORITIZED LOCK REQUESTS TO REDUCE BLOCKING

BACKGROUND

Background and Relevant Art

Computers and computing systems have affected nearly every aspect of modern living. Computers are generally involved in work, recreation, healthcare, transportation, entertainment, household management, etc.

Many computing systems are now implemented where multiple agents or threads can operate on the same computing resources. To prevent conflicting operations from being performed by different agents on the same resource, some systems implement transactional computing. Transactional computing is performed where a set of computing operations is performed atomically (i.e., a transaction) such that all of the operations or none of the operations are performed. An agent can place a lock on a resource (to prevent all or certain kinds of access by other agents) and perform the atomic block of operations. If the block of operations can be completed, then the transaction is committed and the operations are made durable. If any of the operations cannot be performed, the transaction is aborted and all operations are rolled back. After being committed or aborted, the lock(s) can then be released such that other agents can operate on the data.

Data may be organized into databases. When users need to modify the schema of their data, including maintenance operations such as index rebuilding, partition switching, etc., they run Data Definition Language (DDL) statements. The majority of these statements requires an exclusive lock (SCH-M in SQL Server® available from Microsoft® Corporation of Redmond Wash.) on the table, at least for a short amount of time, to disallow concurrent access on the table. To acquire this exclusive lock, the DDL has to wait until all existing transactions have completed (committed or rolled back) and their locks released. During this time all new lock requests are blocked behind the waiting lock.

This behavior creates two major problems for the users. First, if there are long running queries/transactions on the table, the DDL will be blocked for a long time and the DDL operation requested by the user also has to wait. However, there are some operations which need to be executed as soon as possible because their results are important for the user application. A good example is the ALTER TABLE . . . SWITCH PARTITION operation. This DDL allows the user to move a large volume of data into or out of a partitioned table, without requiring physically moving data, but only by modifying the metadata of the source and target tables. When the user executes this statement the user wants the new data to become available as soon as possible.

Second, while the DDL is waiting for the exclusive lock, all new lock requests are blocked and the table is unavailable for other operations. This means that, if the DDL has to wait for a long time, the table is also inaccessible for a long time (even if the exclusive lock is eventually held for a really small amount of time). This can be particularly troublesome for operations which take place under heavy Online Transaction Processing (OLTP) workload. This can also be problematic for operations which are executed during maintenance hours and the user cannot predict when the exclusive lock will be taken. A good example of this scenario is the Online Index Rebuild operation. Online Index Rebuild might take hours, depending on the size of the table, and requires an exclusive lock at the end of the operation. In this case, the operation might try to acquire the exclusive lock when the workload is heavy and this will have a user perceptible impact on the throughput of the system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a transactional computing environment. The method includes requesting a lock on a resource. The request for the lock on the resource is specified as a low priority non-blocking request that does not block one or more other requests such that one or more other requests can request a lock on the resource and obtain the lock on the resource in priority to the low priority non-blocking request, including when the one or more other requests are made after the low priority non-blocking request. Based on the low priority request, the method includes maintaining the low priority request in a non-blocking fashion until a predetermined condition occurs. As a result of the predetermined condition occurring, the method includes handling the low priority request such that it is no longer treated as a low priority non-blocking request.

In another embodiment, a method may be practiced in a transactional computing environment. The method includes acts for requesting a lock on a resource. The method includes identifying a resource. The method further includes issuing a kill lock request as single command. Issuing the kill lock request includes killing any other operations being performed on the resource; aborting any transactions having a lock on the resource; and locking the resource to prevent other agents from operating on the resource or requesting a lock on the resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein may implement two unique and novel lock request types: the "kill" and the "low priority" lock requests.

A "kill" lock request is a highest priority request which kills all blocking transactions and other operations being performed on a resource to acquire the lock as soon as possible. While the "kill" lock is waiting for the killed/aborted transactions to rollback and release their locks, embodiments guarantee that no new lock requests will be granted and that the "kill" request will be the first to be granted once the existing locks are released.

A "low priority" lock request is similar to a normal lock request because it has to wait for all (conflicting) granted locks to be released and existing waiting requests to be granted. However, a "low priority" request also does not block new normal priority requests while it is waiting and guarantees that all normal priority requests (old and new) will be granted before it is.

Utilizing the "kill" lock request, embodiments are able to reduce the time a DDL (or other transactional operation) has to wait for the required locks by killing all blocking transactions. At the same time, using the "low priority" request for the DDLs, embodiments can solve the problem that all new lock requests are blocked while the DDL is waiting for an exclusive lock.

Both of these solutions present some disadvantages. Killing existing user transactions might cause problems to the user application and the fact that a "low priority" request allows new, normal priority requests to be granted first means that this request might wait for an extended period of time or even starve (i.e. wait forever). For this reason, embodiments allow these types to optionally be used for each DDL, but embodiments also allow the user to combine both of them in a single DDL to obtain the behavior that is best for the user's system. As a result, for each DDL the user is able to specify whether they want to wait with low priority and for how long (to avoid starvation); and what action should be taken once the low priority period expires: either killing blocking transactions or waiting with normal priority. Thus, embodiments may be implemented where different types of lock requests are optional and include support for combining both types in a single DDL to give the users the flexibility to choose the behavior that is best for their system. Embodiments may be implemented where these lock request types are not tied to specific DDLs, but can be used for all kinds of transactional operations. Thus, embodiments are not "tied" to use of DDLs, but rather can be used in any one of a number of different scenarios. Embodiments may be implemented where using "low priority" is performed in a fashion which allows them to be combined with "lock partitioning", an important feature for multicore systems as explained below.

Figure 1:
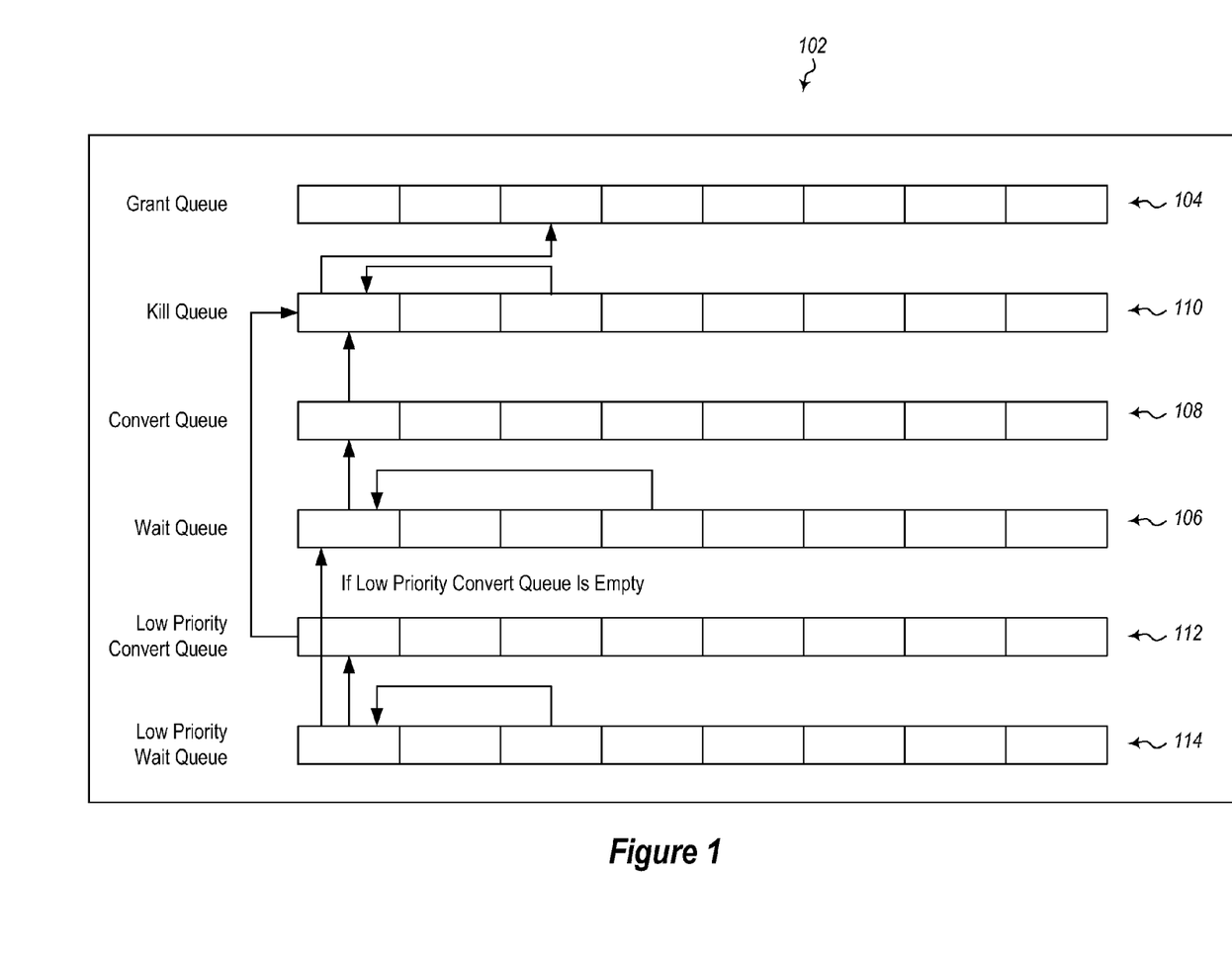
FIG. 1 illustrates a lock manager and a set of queues used to manage transactional locks.

In a Relational Database Management System (RDBMS) locks are used to guarantee transactional consistency. Tables, pages, rows and metadata objects are some of the resources than can be locked. Referring now to FIG. 1, a lock manager 102 is the component which controls when a lock can be acquired. The lock manager 102 does not necessarily understand the role of the various entity resources (i.e. tables, pages rows, metadata objects, etc.) in the database, but distinguishes the various lock resources using a database id for each resource, the type of each resource (e.g. table, page, etc.) and a unique id assigned to each resource. For example, the lock manager 102 may note a database id and a table id if the resource is a table.

For a particular lock resource, the lock manager 102 stores a number of queues. As illustrated in FIG. 1, a grant queue 104 stores all the locks which are currently granted for the particular resource. The wait queue 106 stores all the new normal priority lock requests (for the particular resource) which are waiting to be granted. The convert queue 108 stores all the lock requests (for the particular resource) which are waiting to be granted, but were made by transactions which are already holding a lock on this resource and need to upgrade to a more exclusive lock. This convert queue 108 is used to give higher priority to the convert requests and avoid deadlocks.

When a new lock request comes, the lock manager 102 retrieves the queues for the corresponding lock resource and scans them to check if the requested lock can be immediately granted. If there are conflicting locks in the queues then the request has to wait in the wait queue 106 or the convert queue 108 depending on whether it is a new request or a request for an upgrade.

New requests not only check the grant queue 104 for conflicting locks, but also check the convert queue 108 and the wait queue 106. This is done to honor a First-In-First-Out (FIFO) order in the wait queue 106 to make sure that all waiting requests will be eventually satisfied and are not going to starve. As a result, in previous generations of such systems, new requests would have had to wait until all previous requests were granted, which is the root cause of the problem described above, where all new requests had to wait behind the exclusive request generated by a DDL.

For example, if there is a SQL Server® SCH-S lock granted for table 't', a request for a SCH-M lock on 't' has to wait. SCH-S locks do not block access on the table, but only prevent schema modifications which require a SCH-M lock. If a new transaction requests a SCH-S lock on 't', although this lock is not conflicting with the first SCH-S lock, which is already granted, it cannot be granted because there is a (SCH-M) request waiting in the wait queue 106. The new request has to wait behind the request for the SCH-M lock in the wait queue 106, to ensure that the SCH-M request will be granted first.

To overcome this wait, some embodiments may implement new types of lock requests. Two new types are illustrated herein and referred to as "kill" and "low priority" lock request types. These two new lock request types can modify how new requests are handled; how waiting requests are granted as existing locks are released; and how the deadlock detection mechanism works.

Some embodiments illustrated herein implement a new 'kill' type lock request. A 'kill' lock request is a high priority request which should not block behind any waiting requests (Converts or Waits). For this reason, when a 'kill' request arrives embodiments scan the grant queue 104 to check if the lock can be immediately granted. If there are conflicting locks in the grant queue 104, then the lock cannot be granted and embodiments add the request to a new, special queue, illustrated herein as a 'kill' queue 110, which is a high priority queue for 'kill' lock requests. Then, embodiments scan the grant queue 104 again and abort all the transactions which are holding a conflicting lock on the resource. As it might take time for these transactions to rollback and release their locks, embodiments may then go to sleep until an event is received indicating that the lock has been granted.

The way normal priority requests are handled may be implemented in a fashion that does not change significantly as compared to other transactional system. However, one difference is that, because embodiments have added the 'kill' queue 110, which has higher priority, new normal priority requests also scan the 'kill' queue 110, apart from the grant queue 104, the convert queue 108 and wait queue 106 as illustrated above, to check if there are any conflicting locks. If the lock cannot be granted, then embodiments add the normal priority lock request to the convert queue 108 or the wait queue 106 depending on the request and go to sleep until an event is received indicating that the lock has been granted.

Embodiments may alternatively or additionally implement new 'low priority' requests. To store waiting 'low priority' requests embodiments include two new queues for each lock resource: the 'low priority convert' queue 112 and the 'low priority wait' queue 114. New 'low priority' requests have to wait for all high (i.e. 'kill') and normal priority requests (new or existing), but also have to wait for existing 'low priority requests'. However 'low priority' convert requests do not have to wait for existing 'low priority' requests. For this reason, when a 'low priority' request arrives, embodiments scan all the queues to check if a lock can be granted immediately. If there are conflicting locks in any of these queues, the lock cannot be granted and embodiments add the request to the low priority convert queue 112 or the low priority wait queue 114, depending on the request, and go to sleep until embodiments receive an event that the lock has been granted.

The following illustrates actions that may be performed for granting locks. When a lock is released the lock manager 102 checks whether waiting requests can be granted. The previous algorithm for granting locks involved only the convert queue 108 and the wait queue 106. The algorithm was performed as follows: Scan the convert queue 108 and grant as many locks as possible. If there is a request that cannot be granted, then do not scan the wait queue 106, as embodiments want to have all convert requests granted first. Otherwise, embodiments would scan the wait queue 106 granting locks until embodiments reached a lock that could not be granted. The requests that were waiting behind this lock in the queue would not be granted because embodiments wanted to honor the FIFO order.

Current embodiments have added the three new queues, the kill queue 110, the low priority convert queue 112 and the low priority wait queue 114. The kill queue 110 stores high priority requests which may be granted by killing other transactions. The low priority wait queue 114 stores requests that have to wait for all high priority requests, normal priority requests, and existing low priority requests The low priority convert queue 112 stores requests that have to wait for existing high priority requests and normal priority requests but do not have to wait for existing low priority requests. As such, embodiments may implement an algorithm as follows:

Embodiments scan the kill queue 110 and try to grant as many locks as possible. If there is a lock that cannot be granted, embodiments will not scan any of the other queues because this is a high priority lock and has to be granted first.

If there are no locks that can be granted in the kill queue 110, embodiments, scan the convert queue 108 and wait queue 106 using the algorithm described above.

Embodiments scan the low priority convert queue 112 and try to grant as many locks as possible, even if there were requests in the normal priority queues that were not granted. Embodiments have this special behavior for the convert queues to avoid deadlocks.

If all the requests in the other queues were granted, embodiments scan the low priority wait queue 114 granting locks until embodiments reach a lock that cannot be granted.

Embodiments may include deadlock detection functionality. With the addition of the new queues (i.e. the kill queue 110, the low priority convert queue 112 and the low priority wait queue 114) the deadlock detection mechanism becomes more complicated. For example, as illustrated in FIG. 1, the arrows that connect the different queues show the dependency between the waiting requests. That is, low priority requests wait for normal priority requests, normal priority requests wait for kill requests, kill requests wait for granted requests, etc. This is used by the deadlock detection mechanism to identify the deadlocks.

Embodiments may include functionality for lock partitioning. In some embodiments, the queues of a lock resource are protected from concurrent access using a spinlock. In systems with a large number of CPUs, there is usually a lot of contention on this spinlock. Lock Partitioning solves this problem by partitioning each lock resource X into N different resources $(X,0), (X,1) \ldots (X,N-1)$, where N is the number of CPUs of the machine. The most common locks, which are not exclusive, are acquired on only one partition, but exclusive locks, which ensure that multiple updates cannot be made to the same resource at the same time, are acquired on all the partitions to guarantee that no one has a conflicting lock on another partition. When an exclusive lock is required, embodiments iterate over all the partitions of the resource and acquire the lock on each one individually. This makes the implementation of 'low priority' locks more complicated:

If embodiments need an exclusive lock on resource X, embodiments first try to acquire a low priority' lock on resource/partition (X,0). Once this lock has been acquired, embodiments move to resource/partition (X,1) and wait there with low priority. However, while embodiments are waiting for the lock on this partition embodiments are holding an exclusive lock on the first partition and therefore block all transactions which are trying to acquire normal priority locks on this partition. This is not correct according to the semantics of the 'low priority' lock, since a 'low priority' request should not block any normal priority requests.

For this reason embodiments implement the following algorithm:

Embodiments try to acquire a low priority' lock on the first partition. Once this lock is acquired, embodiments try to lock all the other partitions but without waiting. This means that if the lock cannot be immediately granted, embodiments do not wait but simply return that the lock request failed.

If a request on a partition failed, embodiments unlock the previous partitions that were locked and start the process again from the partition where the request failed. If embodiments have reached the last partition and embodiments need to move to the next one, then embodiments go back to the first partition.

Using this algorithm embodiments do not block normal priority requests while trying to acquire a low priority' lock and, at the same time, by waiting on the partition where the request failed, embodiments avoid spinning around the partitions.

As noted, embodiments may combine the new lock request types. As described previously, the users will have the ability to specify if they want to use 'low priority' locks and for how long, but also what actions will be taken once the low priority period expires. This can be specified by the user at various granularities. For example, a user may specify this functionality using various calls. Alternatively, setting may be made at the database level such that all operations are subject to the use of low priority locks. Internally, embodiments may implement this logic in the caller, which may be the DDL execution, and not inside the lock manager 102. The algorithm is as follows:

If the user wants to use low priority' locks for X seconds, submit a 'low priority' request to the lock manager 102 with timeout equal to X seconds. Otherwise, move to the next step. At the next step, if the request timed out (or the user did not want to use 'low priority' locks), then according to the second option, which specifies if the user wants to use normal priority locks or 'kill' locks, submit a new request to the lock manager 102 using the corresponding type with the default timeout.

Embodiments may be implemented in ways differing from the examples illustrated above. For example, some embodiments may implement consolidated queues. Instead of creating new queues for the new lock request types, the existing queues can be reused. Each queue can be logically split into different parts for high, normal and low priority requests.

Alternatively or additionally, embodiments may change the request type inside lock manager 102: Instead of having the caller handle the low priority timeout and create a new lock request with normal priority or this operation can be done inside the lock manager 102.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
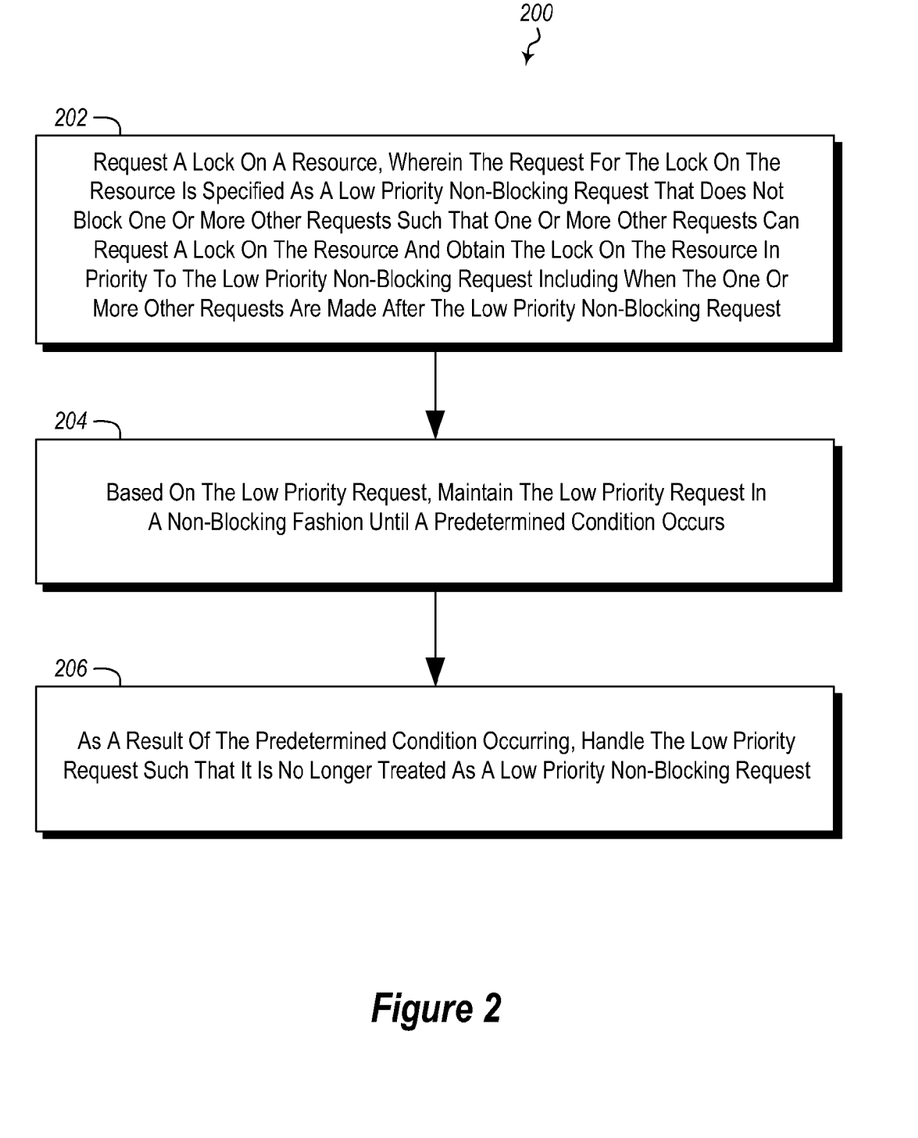
FIG. 2 illustrates a method of requesting a lock on a resource.

Referring now to FIG. 2, a method 200 is illustrated. The method 200 may be practiced in a transactional computing environment. The method 200 includes acts for requesting a lock on a resource. The method 200 includes requesting a lock on a resource (act 202). The request for the lock on the resource is specified as a low priority non-blocking request that does not block one or more other requests such that one or more other requests can request a lock on the resource and obtain the lock on the resource in priority to the low priority non-blocking request. This is done even when the one or more other requests are made after the low priority non-blocking request.

The method 200 further includes, based on the low priority request, maintaining the low priority request in a non-blocking fashion until a predetermined condition occurs (act 204).

As a result of the predetermined condition occurring, the method 200 includes handling the low priority request such that it is no longer treated as a low priority non-blocking request (act 206).

In particular, the method 200 illustrates the case where a low priority non locking lock request is made, but has been in effect and has not been properly serviced, and as such alternative arrangements are made.

The method 200 may be practiced where handling the low priority request such that it is no longer treated as a low priority non-blocking request comprises renewing the low priority request as a normal priority request for a lock on the resource that is handled in accordance with ordinary operating of a transactional computing system. For example, the normal priority request may be handled using FIFO protocols. Renewing the low priority request may include either issuing a new request and cancelling the previous request or upgrading the previous request to a normal priority request.

The method 200 may be practiced where handling the low priority request such that it is no longer treated as a low priority non-blocking request comprises renewing the low priority request as a high priority kill request for a lock on the resource. The high priority kill request may be configured to kill any operations being performed on the resource; abort any transactions having a lock on the resource; and lock the resource to prevent other agents from operating on the resource or requesting a lock on the resource.

The method 200 may be practiced where handling the low priority request such that it is no longer treated as a low priority non-blocking request comprises aborting the low priority request. Thus, embodiments may be implemented to abandon attempts at obtaining the lock and performing corresponding operations associated with the lock.

The method 200 may be practiced where the predetermined condition comprises expiration of a given period of time. For example, embodiments may be configured to maintain a low priority lock request for a given period of time, and once the time has expired the low priority lock request is handled in a different fashion as illustrated above.

The method 200 may be practiced where the predetermined condition comprises the occurrence of a specific time. For example, a low priority request may be valid until a specific day and time or date and time is reached, and which time handling of the request changes.

The method 200 may be practiced where the predetermined condition comprises use of a predetermined amount of storage as a result of the low priority non-blocking request being maintained. In particular, in transactional computing, lock requests result in the use of storage resources to maintain state information. The longer the request is valid, the more state information that needs to be stored. Thus, some embodiments may determine that when a certain amount of storage has been used to store state information that the lock request can be upgraded or abandoned.

The method 200 may be practiced where the predetermined condition comprises a predetermined number of lock requests by other agents occurring. For example, embodiments may count the number of requests for locks that preempt the low priority request. When a sufficient number have preempted the low priority request, the low priority request may be upgraded or abandoned.

The method 200 may be practiced where the predetermined condition comprises user input. For example, a user may perform some keystroke or user interface selection that causes the low priority lock request to be upgraded or abandoned.

While not illustrated here, other external event or faults may cause a low priority lock request to be upgraded or abandoned.

Figure 3:
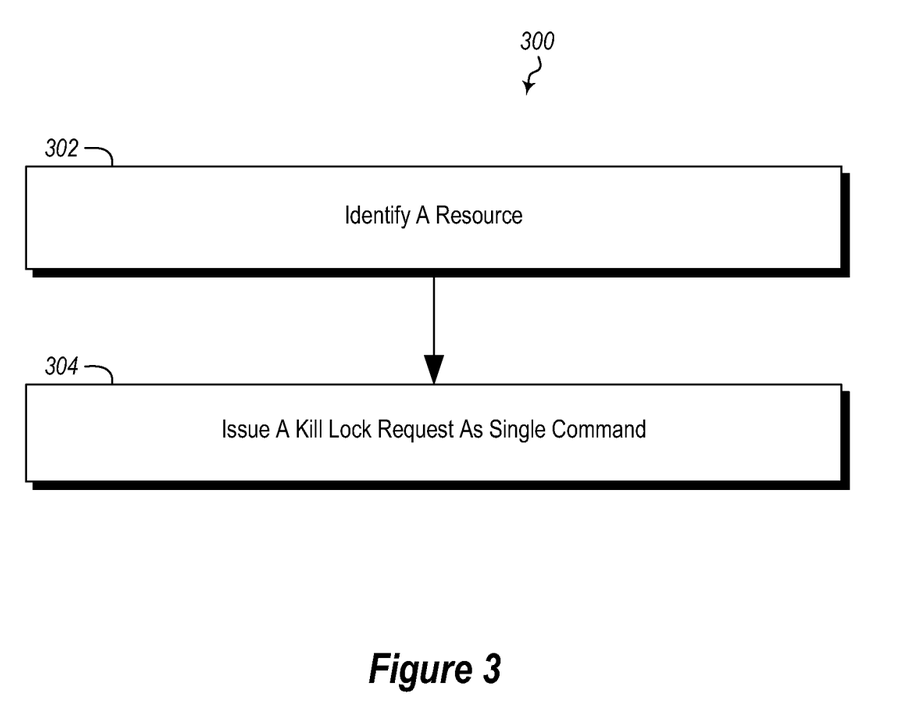
FIG. 3 illustrates another method of requesting a lock on a resource.

Referring now to FIG. 3, a method 300 is illustrated. The method 300 may be practiced in a transactional computing environment. The method 300 includes acts for requesting a lock on a resource. The method 300 includes identifying a resource (act 302). The method 300 further includes issuing a kill lock request as single command (act 304). The kill lock request kills any operations being performed on the resource; aborts any transactions having a lock on the resource; and locks the resource to prevent other agents from operating on the resource or requesting a lock on the resource.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of requesting a lock on a resource in a manner which permits the lock to be prioritized by a user when requesting the lock, the computer-implemented method being performed by one or more processors executing computer executable instructions for the computer-implemented method, and the computer-implemented method comprising:

presenting at a transaction computing environment a request for a lock, the requested lock being based on one of at least first and second options which define priority for a requested lock on a resource provided in the transaction computing environment, the first option being a high priority kill lock request, and the second option being a low priority non-blocking lock request;

if the lock request is specified as a low priority non-blocking lock request, the low priority lock request is a non-blocking request that does not block one or more other requests such that one or more other requests can request a lock on the resource and obtain the lock on the resource in priority to the low priority non-blocking request including when the one or more other requests are made after the low priority non-blocking request;

based on the low priority non-blocking lock request, the low priority non-blocking lock request is maintained in a non-blocking fashion until a predetermined condition occurs; and as a result of the predetermined condition occurring, handling the low priority non-blocking lock request such that it is no longer treated as a low priority non-blocking lock request by either aborting the low priority non-blocking lock request, or renewing the low priority non-blocking lock request as a high priority kill request;

if the lock request is specified as a high priority kill lock request either initially or a as a result of renewing the low priority non-blocking lock request as a high priority kill lock request, killing any operations being performed on the resource;

aborting any transactions having a lock on the resource; and locking the resource to prevent other agents from operating on the resource or requesting a lock on the resource.

2. The computer-implemented method of claim 1, wherein handling the low priority non-blocking lock request such that it is no longer treated as a low priority non-blocking lock request comprises renewing the low priority non-blocking lock request as a normal priority lock request for a lock on the resource of the transactional computing system.

3. The computer-implemented method of claim 1, wherein the predetermined condition comprises expiration of a given period of time.

4. The computer-implemented method of claim 1, wherein the predetermined condition comprises the occurrence of a specific time.

5. The computer-implemented method of claim 1, wherein the predetermined condition comprises use of a predetermined amount of storage as a result of the low priority non-blocking request being maintained.

6. The computer-implemented method of claim 1, wherein the predetermined condition comprises occurrence of a predetermined number of lock requests by other agents.

7. The computer-implemented method of claim 1, wherein the predetermined condition comprises user input.

8. The computer-implemented method of claim 1, wherein the computer-implemented method includes lock partitioning, and wherein requesting a low priority non-blocking lock request on a resource comprises requesting a lock on a first partition, and once the requested low priority non-blocking lock is acquired for the first partition, attempting to lock all other partitions.

9. The computer-implemented method of claim 8, further comprising, determining that one of the other partitions cannot be locked, and as a result, unlocking any locked partitions and repeating requesting a low priority non-blocking lock request on a resource by requesting locks on the partitions beginning by requesting a lock from the partition where the previous request failed.

10. The computer-implemented method of claim 9, wherein if the partitions cannot be locked and a predetermined condition occurs, as a result of the predetermined condition occurring, handling the low priority non-blocking lock request such that it is no longer treated as a low priority non-blocking lock request by either aborting the low priority non-blocking lock request, or renewing the low priority non-blocking lock request as a high priority kill request.

11. The computer-implemented method of claim 10, wherein the predetermined condition comprises expiration of a given period of time.

12. The computer-implemented method of claim 10, wherein the predetermined condition comprises the occurrence of a specific time.

13. The computer-implemented method of claim 10, wherein the predetermined condition comprises use of a predetermined amount of storage as a result of the low priority non-blocking request being maintained.

14. The computer program product of claim 1, wherein handling the low priority non-blocking lock request such that it is no longer treated as a low priority non-blocking lock request comprises renewing the low priority non-blocking lock request as a normal priority lock request for a lock on the resource of the transactional computing system.

15. The computer program product of claim 1, wherein the computer-implemented method includes lock partitioning, and wherein requesting a low priority non-blocking lock request on a resource comprises requesting a lock on a first partition, and once the requested low priority non-blocking lock is acquired for the first partition, attempting to lock all other partitions.

16. A system for requesting a lock on a resource, the system comprising
one or more processors;
one or more computer readable media, wherein the one or more computer readable media comprise computer executable instructions that when executed by at least one of the one or more processors cause at least one of the one or more processors to perform the following computer-implemented method:
requesting a lock on a resource, wherein the request for the lock on the resource is specified as a low priority non-blocking request that does not block one or more other requests such that one or more other requests can request a lock on the resource and obtain the lock on the resource in priority to the low priority non-blocking request including when the one or more other requests are made after the low priority non-blocking request;
based on the low priority request, maintaining the low priority request in a non-blocking fashion until a predetermined condition occurs;
as a result of the predetermined condition occurring, handling the low priority request such that it is no longer treated as a low priority non-blocking request; and
instantiating a plurality of queues, the plurality of queues comprising:
a grant queue, wherein the grant queue stores all the locks which are currently granted for a particular resource
a kill queue, wherein the kill queue stores high priority requests which may be granted by killing any operations being performed on a resource, aborting any transactions having a lock on a resource, and locking the resource to prevent other agents from operating on the resource or requesting a lock on the resource;
a convert queue, wherein the convert queue stores all lock requests for a particular resource which are waiting to be granted, but were made by transactions which are already holding a lock on a resource and need to upgrade to a more exclusive lock;
a wait queue, wherein the wait queue stores all new normal priority lock requests for a particular resource which are waiting to be granted;
a low priority wait queue, wherein the low priority wait queue stores requests that have to wait for all high priority requests, normal priority requests, and existing low priority requests; and
a low priority convert queue, wherein the low priority convert queue stores requests that have to wait for existing high priority requests and normal priority requests but do not have to wait for existing low priority requests.

17. The system of claim 16, wherein handling the low priority request such that it is no longer treated as a low priority non-blocking request comprises renewing the low priority request as a normal priority request for a lock on the resource that is handled in accordance with ordinary operating of a transactional computing system.

18. The system of claim 16, wherein handling the low priority request such that it is no longer treated as a low priority non-blocking request comprises renewing the low priority request as a high priority kill request for a lock on the resource, wherein the high priority kill request configured to:
- kill any operations being performed on the resource;
- abort any transactions having a lock on the resource; and
- lock the resource to prevent other agents from operating on the resource or requesting a lock on the resource.

19. The system of claim 16, wherein renewing the low priority request as a high priority kill request comprises adding the request to the kill queue.

20. A computer program product comprising physical storage media containing executable instructions which, when executed by one or more processors, cause the one or more processors to perform a computer-implemented method of requesting a lock on a resource in a manner which permits the lock to be prioritized by a user when requesting the lock, and the computer-implemented method comprising:
- presenting at a transaction computing environment a request for a lock, the requested lock being based on one of at least first and second options which define priority for a requested lock on a resource provided in the transaction computing environment, the first option being a high priority kill lock request, and the second option being a low priority non-blocking lock request;
- if the lock request is specified as a low priority non-blocking lock request,
  - the low priority lock request is a non-blocking request that does not block one or more other requests such that one or more other requests can request a lock on the resource and obtain the lock on the resource in priority to the low priority non-blocking request including when the one or more other requests are made after the low priority non-blocking request;
  - based on the low priority non-blocking lock request, the low priority non-blocking lock request is maintained in a non-blocking fashion until a predetermined condition occurs; and
  - as a result of the predetermined condition occurring, handling the low priority non-blocking lock request such that it is no longer treated as a low priority non-blocking lock request by either aborting the low priority non-blocking lock request, or renewing the low priority non-blocking lock request as a high priority kill request;
- if the lock request is specified as a high priority kill lock request either initially or a as a result of renewing the low priority non-blocking lock request as a high priority kill lock request,
  - killing any operations being performed on the resource;
  - aborting any transactions having a lock on the resource; and
  - locking the resource to prevent other agents from operating on the resource or requesting a lock on the resource.

* * * * *